US012009909B2

(12) United States Patent
Casey

(10) Patent No.: US 12,009,909 B2
(45) Date of Patent: Jun. 11, 2024

(54) CONTENT LINKING MULTICAST STREAMING FOR BROADCAST RADIO

(71) Applicant: iBiquity Digital Corporation, Calabasas, CA (US)

(72) Inventor: Dave Casey, Calabasas, CA (US)

(73) Assignee: iBiquity Digital Corporation, Columbia, MD (US)

(*) Notice: Subject to any disclaimer, the term of this patent is extended or adjusted under 35 U.S.C. 154(b) by 228 days.

(21) Appl. No.: 17/478,294

(22) Filed: Sep. 17, 2021

(65) Prior Publication Data
US 2022/0094457 A1  Mar. 24, 2022

Related U.S. Application Data

(60) Provisional application No. 63/080,700, filed on Sep. 19, 2020.

(51) Int. Cl.
*H04H 20/06* (2008.01)
*H04W 72/30* (2023.01)

(52) U.S. Cl.
CPC ............ *H04H 20/06* (2013.01); *H04W 72/30* (2023.01); *H04H 2201/11* (2013.01); *H04H 2201/13* (2013.01); *H04H 2201/20* (2013.01)

(58) Field of Classification Search
None
See application file for complete search history.

(56) References Cited

U.S. PATENT DOCUMENTS

| 8,014,446 B2 * | 9/2011 | Shah | H04H 20/426 348/473 |
| 8,144,612 B2 * | 3/2012 | Johnson | H04N 21/435 370/252 |

(Continued)

FOREIGN PATENT DOCUMENTS

| AU | 2006297131 A1 * | 5/2008 | ............ G06Q 30/02 |
| AU | 2019457816 A1 * | 3/2022 | ............ G01S 5/021 |

(Continued)

OTHER PUBLICATIONS

Hoeckmann et al. Multimedia Broadcast Multicast Services in Mobile; MBMS-IEEE Com Mag, 2006 (Year: 2006).*

*Primary Examiner* — Berhanu Tadese
(74) *Attorney, Agent, or Firm* — Lerner David LLP

(57) ABSTRACT

Embodiments presented herein are directed to "content linking multicast streaming" The embodiments connect a listener to over-the-air (OTA) broadcast radio content using an Internet Protocol (IP) multicast stream of the broadcast radio content when, for example, (i) a traditional broadcast radio receiver is not available, or (ii) an OTA broadcast radio signal that carries the content is not available. For example, when recovery of the OTA broadcast radio signal by a car radio is not possible because of poor reception or because the car radio is not configured with a suitable broadcast radio tuner, the embodiments generate a link to a multicast stream of the OTA broadcast radio content (also referred to as a "multicast broadcast radio stream" or simply a "multicast stream"), and provide the link to the car radio. The car radio can then access the multicast stream of the OTA broadcast radio content using the link.

20 Claims, 11 Drawing Sheets

(56) References Cited

U.S. PATENT DOCUMENTS

| | | | | |
|---|---|---|---|---|
| 8,351,843 B2 * | 1/2013 | Dillon | H04H 60/33 | 455/3.06 |
| 8,451,868 B2 * | 5/2013 | Johnson | H04N 21/439 | 725/112 |
| 8,520,852 B2 * | 8/2013 | Shah | H04H 20/31 | 380/37 |
| 8,576,949 B2 * | 11/2013 | Shah | H04H 40/27 | 348/473 |
| 8,626,588 B2 * | 1/2014 | Rajaram | H04L 51/10 | 705/14.69 |
| 8,660,128 B2 * | 2/2014 | Iannuzzelli | H04N 21/233 | 370/503 |
| 8,660,479 B2 * | 2/2014 | Johnson | H04H 40/18 | 455/550.1 |
| 8,676,114 B2 * | 3/2014 | Dillon | H04H 60/33 | 455/3.06 |
| 8,804,037 B2 * | 8/2014 | Johnson | H04N 21/235 | 370/514 |
| 8,966,544 B2 * | 2/2015 | Perry, II | H04N 21/2381 | 725/74 |
| 8,966,549 B2 * | 2/2015 | Perry, II | H04N 21/6131 | 725/74 |
| 9,118,427 B2 * | 8/2015 | Shah | H04H 40/27 | |
| 9,877,082 B2 * | 1/2018 | Zaveri | H04L 12/1859 | |
| 10,277,343 B2 * | 4/2019 | Carlock | G06F 16/433 | |
| 10,826,634 B2 * | 11/2020 | Carlock | H04H 60/46 | |
| 10,868,621 B1 * | 12/2020 | Venezia | H04H 60/73 | |
| 10,915,081 B1 * | 2/2021 | Nixon | H04W 4/00 | |
| 11,025,354 B2 * | 6/2021 | Venezia | G01S 5/021 | |
| 11,165,839 B2 * | 11/2021 | Nixon | G05B 19/4185 | |
| 11,436,242 B2 * | 9/2022 | Nixon | G06F 16/24575 | |
| 11,627,175 B2 * | 4/2023 | Nixon | H04L 63/0428 | 709/217 |
| 11,907,613 B2 * | 2/2024 | Lee | H04L 67/30 | |
| 2002/0046405 A1 * | 4/2002 | Lahr | H04N 21/6125 | 725/87 |
| 2006/0015928 A1 * | 1/2006 | Setty | H04N 21/6405 | 725/151 |
| 2007/0078708 A1 * | 4/2007 | Yu | G06Q 30/02 | 705/14.69 |
| 2008/0025241 A1 * | 1/2008 | Bhushan | H04N 21/6131 | 370/312 |
| 2009/0061763 A1 * | 3/2009 | Dillon | H04H 20/28 | 455/3.05 |
| 2010/0287585 A1 * | 11/2010 | Frondal | H04N 7/17318 | 725/31 |
| 2013/0109296 A1 * | 5/2013 | Dillon | H04H 20/71 | 455/3.06 |
| 2016/0182192 A1 * | 6/2016 | Milbar | H04H 60/12 | 714/748 |
| 2018/0198544 A1 * | 7/2018 | Walker | H04L 65/103 | |
| 2019/0132697 A1 * | 5/2019 | Lisewski | H04W 4/02 | |
| 2019/0342020 A1 * | 11/2019 | Carlock | H04H 60/46 | |
| 2020/0153522 A1 * | 5/2020 | Dillon | H04H 60/90 | |
| 2020/0228215 A1 * | 7/2020 | Harb | H04N 21/6125 | |
| 2021/0021360 A1 * | 1/2021 | Venezia | H04H 60/73 | |
| 2022/0094457 A1 * | 3/2022 | Casey | H04H 20/24 | |
| 2022/0229628 A1 * | 7/2022 | Lee | H04R 27/00 | |
| 2022/0256314 A1 * | 8/2022 | Lee | H04W 4/06 | |
| 2022/0263883 A1 * | 8/2022 | Lee | G10L 19/24 | |
| 2022/0300502 A1 * | 9/2022 | Enver | G06F 16/2465 | |
| 2022/0321368 A1 * | 10/2022 | Lee | H04L 12/189 | |
| 2022/0353616 A1 * | 11/2022 | Lee | H04R 5/04 | |
| 2022/0405278 A1 * | 12/2022 | Nixon | G05B 13/0265 | |
| 2023/0155708 A1 * | 5/2023 | Milbar | G08B 3/10 | 370/312 |

FOREIGN PATENT DOCUMENTS

| | | | | |
|---|---|---|---|---|
| CA | 2624545 A1 * | 4/2007 | | G06Q 30/02 |
| CA | 2672251 A1 * | 7/2008 | | H04H 20/33 |
| CA | 2698336 A1 * | 3/2009 | | H04H 20/28 |
| CA | 2960086 A1 * | 3/2009 | | H04H 20/28 |
| CA | 2733513 A1 * | 2/2010 | | H04H 20/31 |
| CA | 2758828 A1 * | 10/2010 | | H04H 20/30 |
| CA | 2766479 A1 * | 2/2011 | | H04H 20/103 |
| CA | 2775769 A1 * | 4/2011 | | H04H 20/18 |
| CA | 2698336 C * | 4/2017 | | H04H 20/28 |
| CA | 2758828 C * | 10/2017 | | H04H 20/30 |
| CA | 2766479 C * | 1/2018 | | H04H 20/103 |
| CA | 2775769 C * | 2/2019 | | H04H 20/18 |
| CA | 2960086 C * | 4/2020 | | H04H 20/28 |
| CA | 2672251 C * | 9/2020 | | H04H 20/33 |
| CA | 3147864 A1 * | 1/2021 | | G01S 5/021 |
| CN | 101849377 A * | 9/2010 | | H04H 20/28 |
| CN | 102388555 A * | 3/2012 | | H04H 20/30 |
| CN | 102549933 A * | 7/2012 | | H04H 20/103 |
| CN | 102648595 A * | 8/2012 | | H04H 20/18 |
| CN | 101849377 B * | 1/2013 | | H04H 20/28 |
| CN | 102549933 B * | 5/2015 | | H04H 20/103 |
| CN | 102648595 B * | 5/2015 | | H04H 20/18 |
| CN | 102388555 B * | 6/2015 | | H04H 20/30 |
| CN | 114287113 A * | 4/2022 | | G01S 5/021 |
| DE | 102020124501 A1 * | 3/2021 | | G05B 19/4185 |
| DE | 102020124562 A1 * | 3/2021 | | G05B 19/0425 |
| DE | 102020124555 A1 * | 4/2021 | | G05B 13/02 |
| DE | 112020006058 T5 * | 1/2023 | | G06F 16/24568 |
| GB | 2464896 A * | 5/2010 | | H04H 20/28 |
| GB | 2464896 B * | 5/2013 | | H04H 20/28 |
| GB | 2495040 B * | 5/2013 | | H04H 20/28 |
| GB | 2590122 A * | 6/2021 | | G05B 19/4185 |
| GB | 2590761 A * | 7/2021 | | G05B 13/02 |
| GB | 2591539 A * | 8/2021 | | G05B 19/0425 |
| JP | 5161092 B2 * | 3/2013 | | G06Q 30/02 |
| RU | 2396730 C2 * | 8/2010 | | H04L 12/1818 |
| RU | 2398361 C2 * | 8/2010 | | H04L 12/1818 |
| RU | 2398362 C2 * | 8/2010 | | H04L 12/1818 |
| WO | WO-2007041369 A2 * | 4/2007 | | G06Q 30/02 |
| WO | WO-2007041370 A2 * | 4/2007 | | G06Q 30/02 |
| WO | WO-2008079959 A2 * | 7/2008 | | H04H 20/33 |
| WO | WO-2009032257 A1 * | 3/2009 | | H04H 20/28 |
| WO | WO-2010014492 A2 * | 2/2010 | | H04H 20/31 |
| WO | WO-2010120723 A1 * | 10/2010 | | H04H 20/30 |
| WO | WO-2011014867 A1 * | 2/2011 | | H04H 20/103 |
| WO | WO-2011044349 A1 * | 4/2011 | | H04H 20/18 |
| WO | WO-2019213477 A1 * | 11/2019 | | H04H 60/46 |
| WO | WO-2020004767 A1 * | 1/2020 | | |
| WO | WO-2020236200 A1 * | 11/2020 | | H04H 20/26 |
| WO | WO-2021015716 A1 * | 1/2021 | | G01S 5/021 |
| WO | WO-2021119140 A1 * | 6/2021 | | G06F 16/24568 |
| WO | WO-2021206675 A1 * | 10/2021 | | G08B 27/005 |
| WO | WO-2022060417 A1 * | 3/2022 | | H04H 20/24 |

* cited by examiner

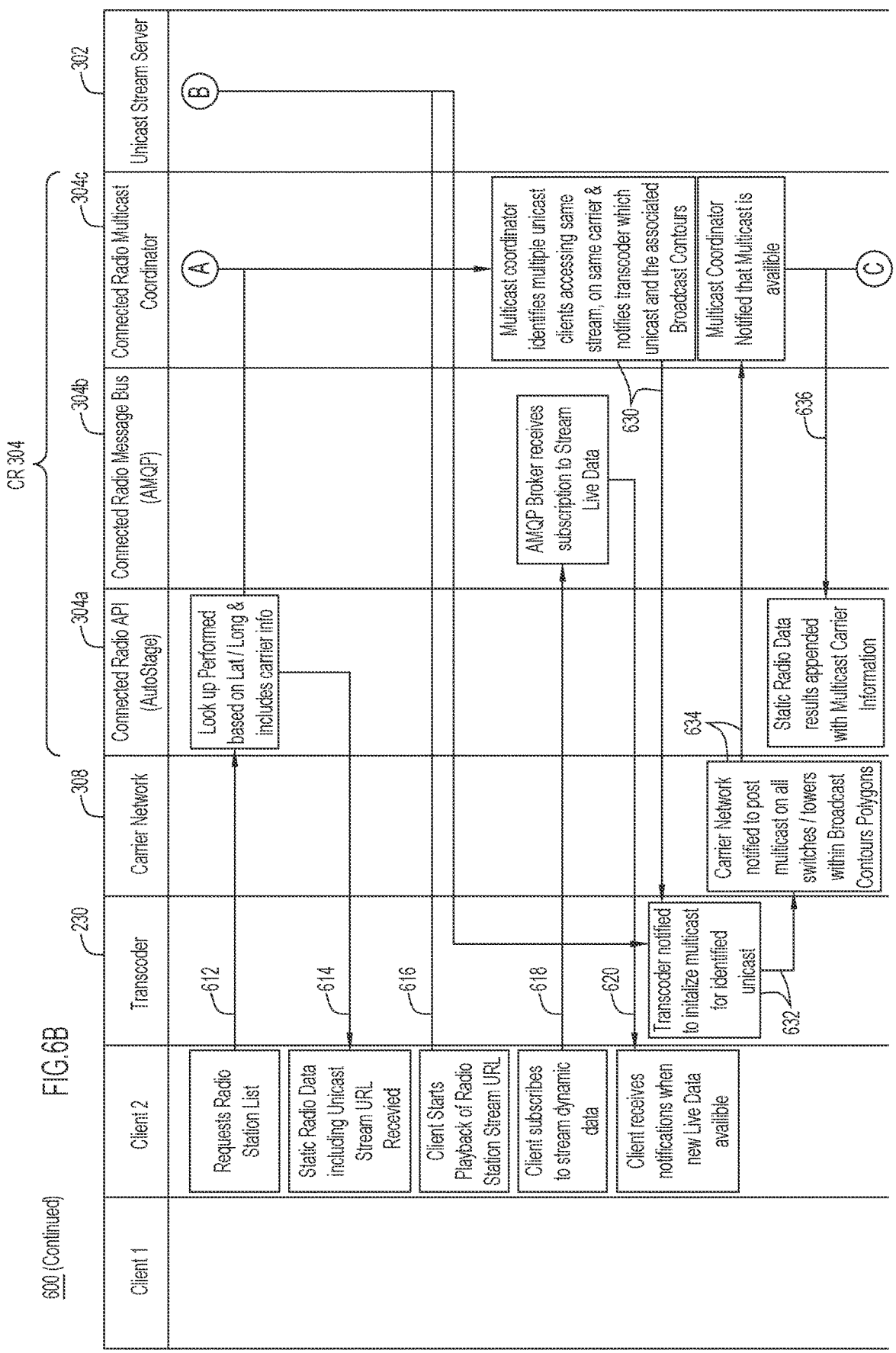

800

802 — RECEIVE INFORMATION, INCLUDING CELLULAR NETWORK INFORMATION AND BROADCAST RADIO AUDIO STREAM INFORMATION, FROM MULTIPLE CLIENT RADIOS

804 — UPON DETERMINING THAT THE MULTIPLE CLIENT RADIOS ARE ALL SIMULTANEOUSLY ACCESSING A SAME UNICAST AUDIO STREAM ASSOCIATED WITH A PARTICULAR BROADCAST RADIO STATION OVER A SAME CELLULAR NETWORK BASED ON THE INFORMATION, CONFIGURE THE SAME CELLULAR NETWORK TO CONVERT DESIGNATED AUDIO STREAM (E.G., THE SAME UNICAST AUDIO STREAM) TO A MULTICAST AUDIO STREAM

806 — UPON RECEIVING A MULTICAST ADDRESS FOR THE MULTICAST AUDIO STREAM FROM THE SAME CELLULAR NETWORK, SEND THE MULTICAST ADDRESS TO THE MULTIPLE CLIENT RADIOS TO ENABLE THE MULTIPLE CLIENT RADIOS TO ACCESS THE MULTICAST AUDIO STREAM

FIG.8

CONTENT LINKING MULTICAST STREAMING FOR BROADCAST RADIO

CLAIM TO PRIORITY

This application claims priority to U.S. Provisional Application No. 63/080,700, filed Sep. 19, 2020, which is incorporated herein by reference in its entirety.

TECHNICAL FIELD

The present disclosure relates to multicast streaming of broadcast radio content.

BACKGROUND

Unicast and multicast are two primary means of transmitting streaming data (such as audio and video data) across the Internet. In a unicast broadcast stream, a server delivers a distinct data stream to each client receiving the broadcast. Unicast streaming is popular but has a disadvantage of using a large amount of bandwidth. The unicast broadcast model does not scale well. By way of example, streaming a small video requiring 100 kilobytes of bandwidth for a single client receiving the broadcast stream uses 100 times that bandwidth to stream to 100 clients, or 10 megabytes of bandwidth. This can quickly overwhelm network resources and cause network congestion and increased server load that ultimately decreases the overall quality of the broadcast. Thus, unicast streaming can be cost prohibitive from a bandwidth perspective.

While multicast streaming can reduce overall streaming bandwidth compared to unicast streaming, conventional solutions for switching between unicast and multicast streaming in the context of streaming content associated with broadcast radio stations over public networks are limited and inflexible.

BRIEF DESCRIPTION OF THE DRAWINGS

FIGS. 6A-6C collectively represent a transaction diagram of example transactions that may be used to perform the method of FIG. 5.

FIG. 8 is a flowchart of an example method of content linking multicast streaming performed primarily by a connected radio service in concert with multiple client radios in the environment of FIG. 3.

DESCRIPTION OF EXAMPLE EMBODIMENTS

Example Embodiments

Figure 1:
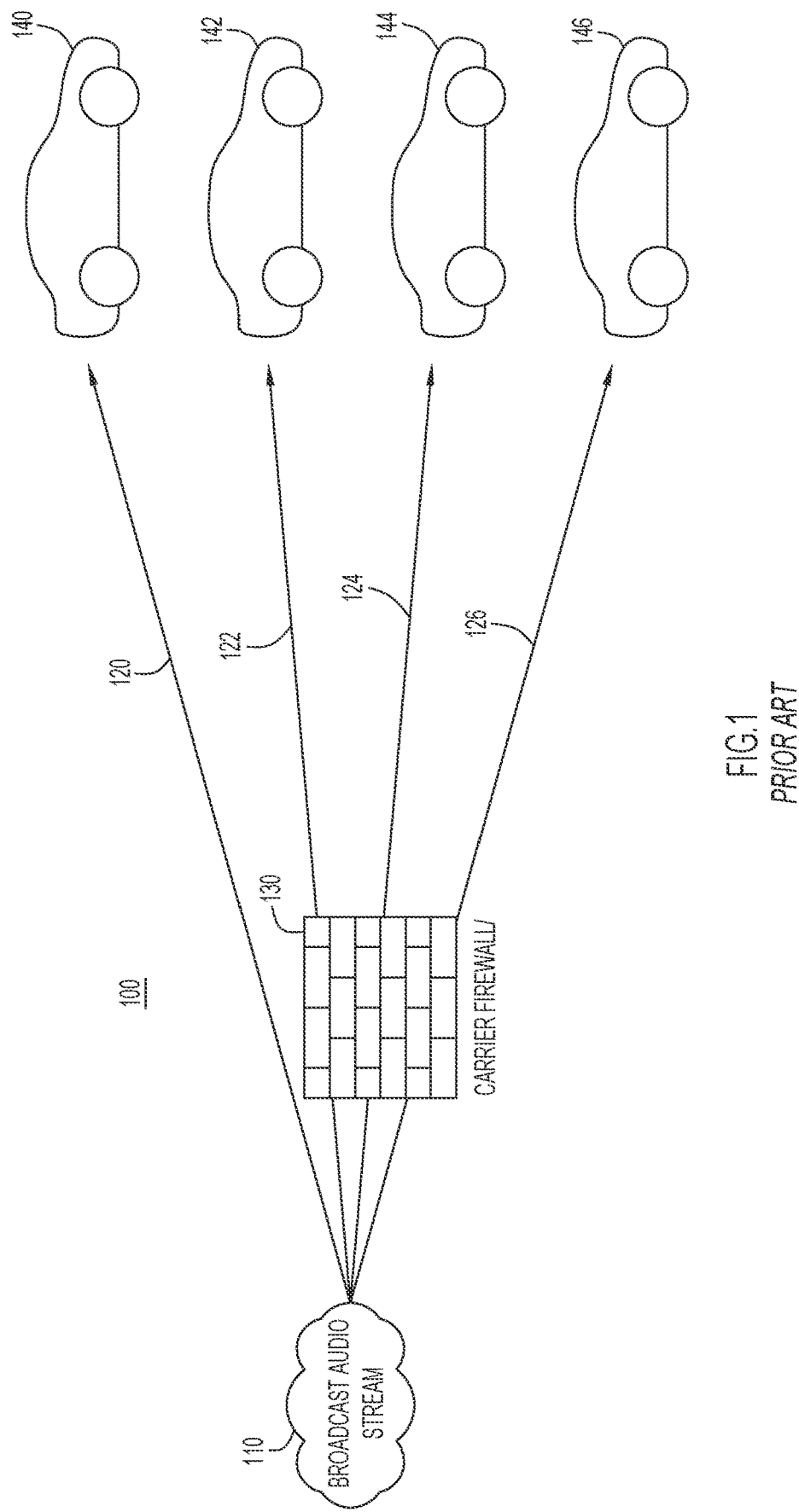
FIG. 1 is an illustration of a conventional unicast streaming model in a cellular network.

Embodiments presented herein are directed to "content linking multicast streaming." The embodiments connect a listener to over-the-air (OTA) broadcast radio content using an Internet Protocol (IP) multicast stream of the broadcast radio content when, for example, (i) a traditional broadcast radio receiver is not available, or (ii) an OTA broadcast radio signal that carries the content is not available. For example, when recovery of the OTA broadcast radio signal by a car radio is not possible because of poor reception or because the car radio is not configured with a suitable broadcast radio tuner, the embodiments generate a link to a multicast stream of the OTA broadcast radio content (also referred to as a "multicast broadcast radio stream" or simply a "multicast stream"), and provide the link to the car radio. The car radio can then access the multicast stream of the OTA broadcast radio content using the link. This is in contrast to current point-to-point (i.e., unicast) Internet streams used for hybrid radios, for example, which consume their own bandwidth over cellular networks.

The embodiments coordinate with both (i) a cellular network (also referred to as a "carrier" network), to make the multicast stream available in a specific geographical region, and (ii) "client" radios configured to connect to the cellular network, so that the client radios are able access the multicast stream using the link. The embodiments may also notify the cellular network when it can de-provision the multicast stream after there are no longer listeners (i.e., client radios) in the specific geographical region.

Hybrid digital radio combines OTA broadcast radio and IP streaming technology. One type of hybrid digital radio is DTS® Connected Radio (CR) developed by iBiquity Digital Corp. By way of example, only, embodiments of content linking multicast streaming may be implemented in the context of DTS Connected Radio to capture the "one-to-many" benefits of broadcast radio and apply the benefits to a cellular network multicast streaming infrastructure. It is understood that content linking multicast streaming may be implemented in other contexts.

When implemented in a mixed OTA broadcast radio and cellular network environment, as described below, for example, the embodiments directed to content linking multicast streaming provide several benefits across a wide spectrum of areas. The embodiments reduce bandwidth consumption over cellular networks, and may permit carriers of the cellular networks to reclaim frequency modulation (FM) bandwidth for cellular usage.

For a consumer, benefits include reduced (or elimination of) broadcast radio streaming charges. Automobile manufacturers are able to offer free broadcast radio content for customers without the additional cost for a broadcast radio tuner. This may also reduce or eliminate data usage fees typically paid by the manufacturers or the consumer.

For radio broadcasters, benefits of the embodiments include possible savings in traditional OTA content licensing fees when unicasting the content over a cellular network. In addition, the embodiments allow radio broadcasters to maintain a presence in an automotive space as technology continues to transition away from amplitude modulation (AM)/FM/digital audio broadcasting (DAB), and toward advanced cellular networks. Another benefit for radio broadcasters is that multicast radio broadcast streaming allows insertion of advertisements.

Figure 2:
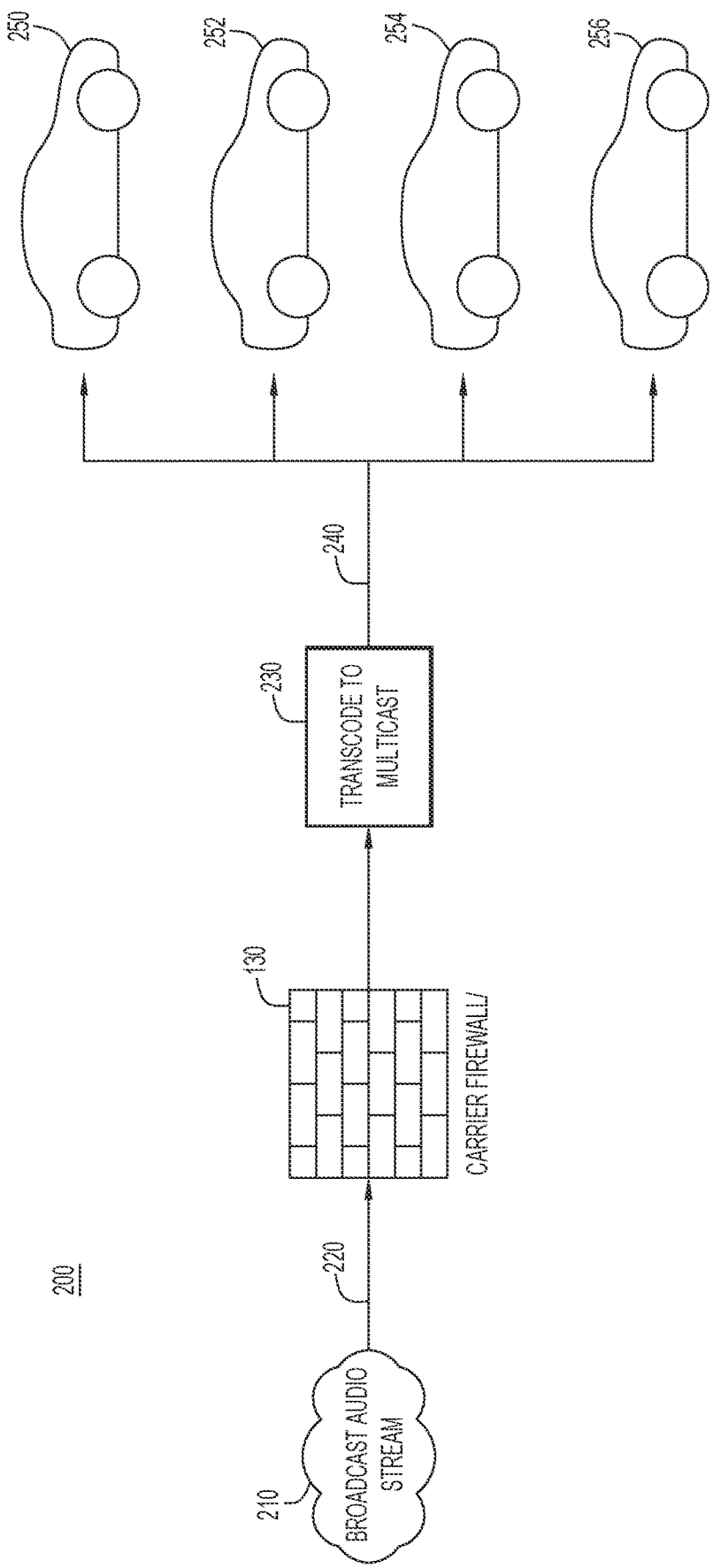
FIG. 2 is an illustration of an example of content linking multicast streaming in the context of Connected Radio (CR).

A contrast between unicast broadcast radio and multicast broadcast radio is drawn with reference to FIGS. 1 and 2. FIG. 1 is an illustration of a general overview of a conventional unicast streaming model 100 in a cellular network (not specifically shown). Model 100 includes streaming broadcast radio as a broadcast audio stream 110 from a content server, for example. Broadcast audio stream 110 includes multiple separate unicast broadcast streams 120, 122, 124, and 126 that carry identical or nearly identical audio content, which may originate from a broadcast radio station (also referred to as a "radio broadcast station").

The unicast broadcast streams 120, 122, 124, and 126 traverse a cellular network firewall 130 to prevent unauthorized access to the cellular network. Each of unicast broadcast streams 120, 122, 124, and 126 is streamed to an individual radio, which may reside in an automobile. For example, as shown in FIG. 1, unicast broadcast streams 120, 122, 124, and 126 are streamed to car radios/automobiles 140, 142, 144, and 146, respectively.

FIG. 2 is an illustration of an example of generalized content linking multicast streaming 200 in the context of DTS Connected Radio, for example. In the example of FIG. 2, a broadcast audio stream 210 is sent as a unicast broadcast stream 220 to a transcoder 230, through firewall 130. Generally, a transcoder converts (i.e., transcodes) an audio file/stream from one encoding format to another encoding format to increase the number of target devices on which the audio file/stream can be played-back. More specifically, transcoder 230 transcodes unicast broadcast stream 220 into a single multicast broadcast stream 240. The multicast broadcast stream 240 is multicast streamed to multiple client radios 250, 252, 254, and 256 carried separately in multiple automobiles, for example. Any known or hereafter developed transcoding technique(s) may be employed by transcoder 230 to perform the transcoding operations described herein.

Figure 3:
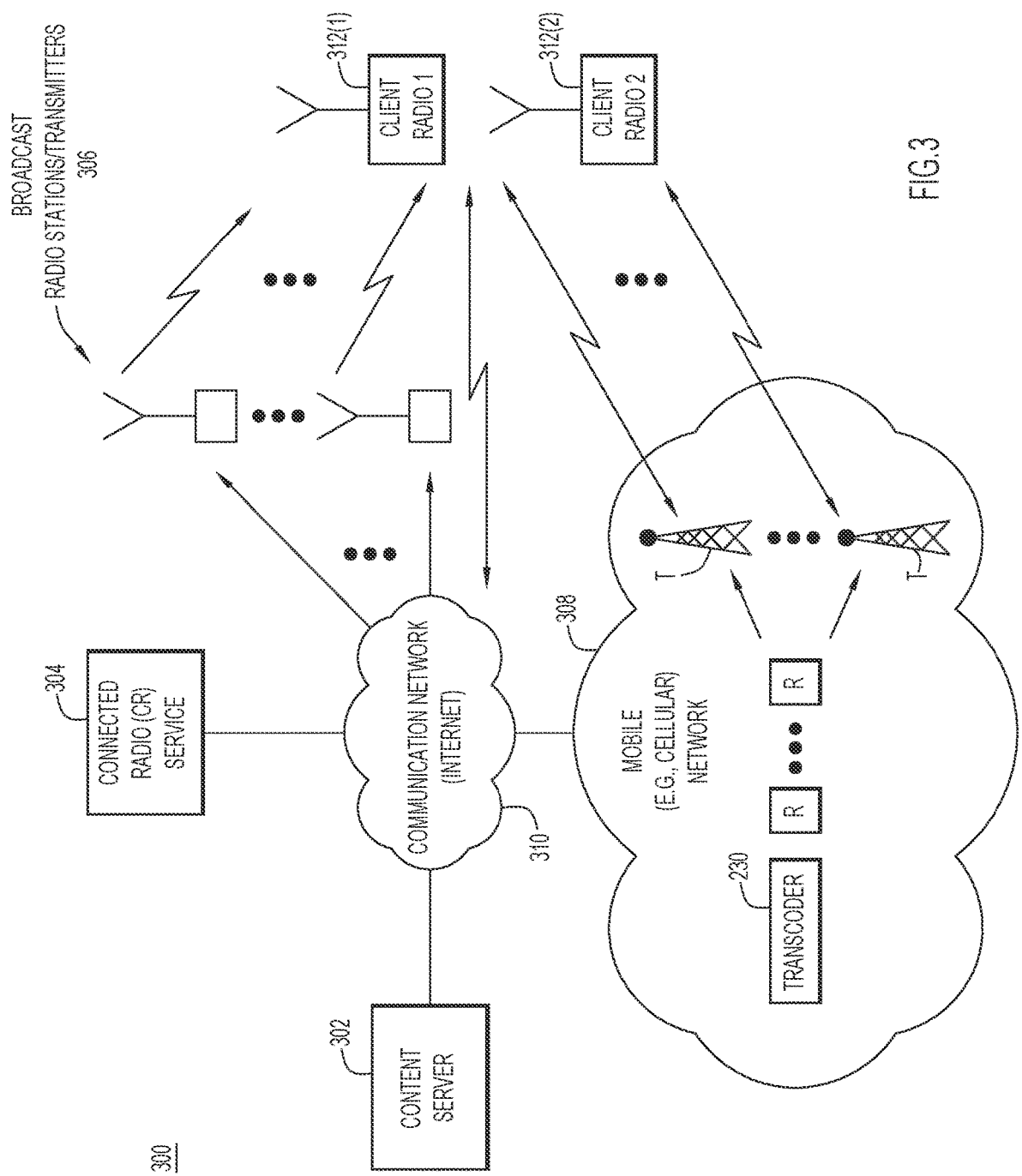
FIG. 3 is a block diagram of an example broadcast radio and mobile network environment in which embodiments directed to content linking multicast streaming may be implemented.

With reference to FIG. 3, there is a block diagram of an example mixed broadcast radio and mobile network environment 300 in which embodiments directed to content linking multicast streaming may be implemented. Environment 300 includes a content server 302 (or many such content servers) that stores audio content for streaming, a cloud-based connected radio (CR) service 304 (also referred to as simply "CR 304"), multiple broadcast radio stations 306 operated by radio broadcasters, and a mobile network 308 (e.g., a cellular network 308), which may all be connected to a communication network 310 over which the aforementioned entities may communicate. In an example, CR 304 represents DTS Connected Radio extended or modified to include additional features and functionality that implement content linking multicast streaming, as presented herein.

Communication network 310 may include one or more wide area networks (WANs), such as the Internet, and one or more local area networks (LANs), e.g., Ethernet and WiFi networks, for example. Environment 300 also includes multiple client radios 312(1) and 312(2) configured to communicate wirelessly with broadcast radio stations 306, mobile network 308, and communication network 310. "Client" radios 312(1) and 312(2) are so named because they may each operate as a "client" of CR 304, as described below. Although only two client radios are shown, there may be many more client radios in a typical environment.

Broadcast radio stations 306 transmit broadcast radio signals on channels/frequencies spanning a broadcast radio band (e.g., the Very High Frequency (VHF)). The broadcast radio signals may include conventional AM and FM radio signals, and digital radio broadcasting (DRB) signals, including in-band on-channel (IBOC) radio signals, such as HD Radio™ signals. Thus, broadcast radio stations 306 transmit OTA broadcast radio content, as is known.

CR 304 may include applications hosted on one or more servers that are connected to communication network 310. Accordingly, client radios 312(1) and 312(2) (collectively referred to as "client radios 312") may establish respective wireless data connections with CR 304 over cellular network 308 and communication network 310 (e.g., the Internet), for example. CR 304 pairs OTA broadcast content delivered by/associated with broadcast radio stations 306 with IP-delivered metadata (such as information about on-air radio programs, talent, artist, song, station contact, and the like) and content (lyrics, related events, podcasts) personalized to create a unique and engaging radio listening experience. CR 304 enables a transition for the listener (e.g., operators of client radios 312) from content carried in OTA broadcast radio signals to the same content delivered through Internet streaming, when the OTA broadcast radio signal is not available. To achieve this, CR 304 implements content linking multicast streaming.

Mobile network 308 is spread over a wide area and may be configured to operate (e.g., transmit OTA signals) in accordance with any known or hereafter developed mobile/cellular network technology/standard, including, but not limited to, Global System for Mobile Communications (GSM), Code Division Multiple Access (CDMA), time-division multiple access (TDMA), XG (e.g., 2G, 3G, 4G, 5G, and so on), Long Term Evolution (LTE), and so on. In the ensuing description, mobile network 308 will be referred to as "cellular network 308."

Cellular network 308 includes transcoder 230, network devices R (e.g., routers and switches), cell towers/transmitters T, and firewalls (such as firewall 130). Cellular network 308 configures network devices R to forward traffic between various sources and destinations based on configuration information available to the cellular network, as is known. For example, network devices R may be configured to forward data packets between communication network 310 and cell transmitters T (and hence to/from client radios 312), between transcoder 230 and the cell transmitters, and so on. The data packets carry a variety of information, including, but not limited to, unicast and multicast audio streams, live data, static data, requests and responses, and so on. Cellular network 308 may include private and public mobile network segments. For example, transcoder 230 may be included in a private segment. Cellular network 308 is shown separate from communication network 310 in the example of FIG. 3; however, it is understood that all, or portions, of the cellular network may be incorporated into the communication network.

Data packet formatting and forwarding in communication network 310 and cellular network 308 may be implemented in accordance with any known or hereafter developed data network protocols, including, but not limited to, the IP protocols, including the User Datagram Protocol (UDP), the Transmission Control Protocol (TCP), Real-Time Transport (RTP), Real Time Streaming Protocol (RTSP), Internet Group Management Protocol (IGMP), Border Gateway Protocol (BGP), Multicast Listener Discovery (MLD), IP version 4 (IPv4), IP version 6 (IPv6), and so on. Moreover, known unicast and multicast packet forwarding protocols and techniques, e.g., addressing schemes, may be employed to facilitate the content linking multicast streaming improvements presented herein.

Figure 4:
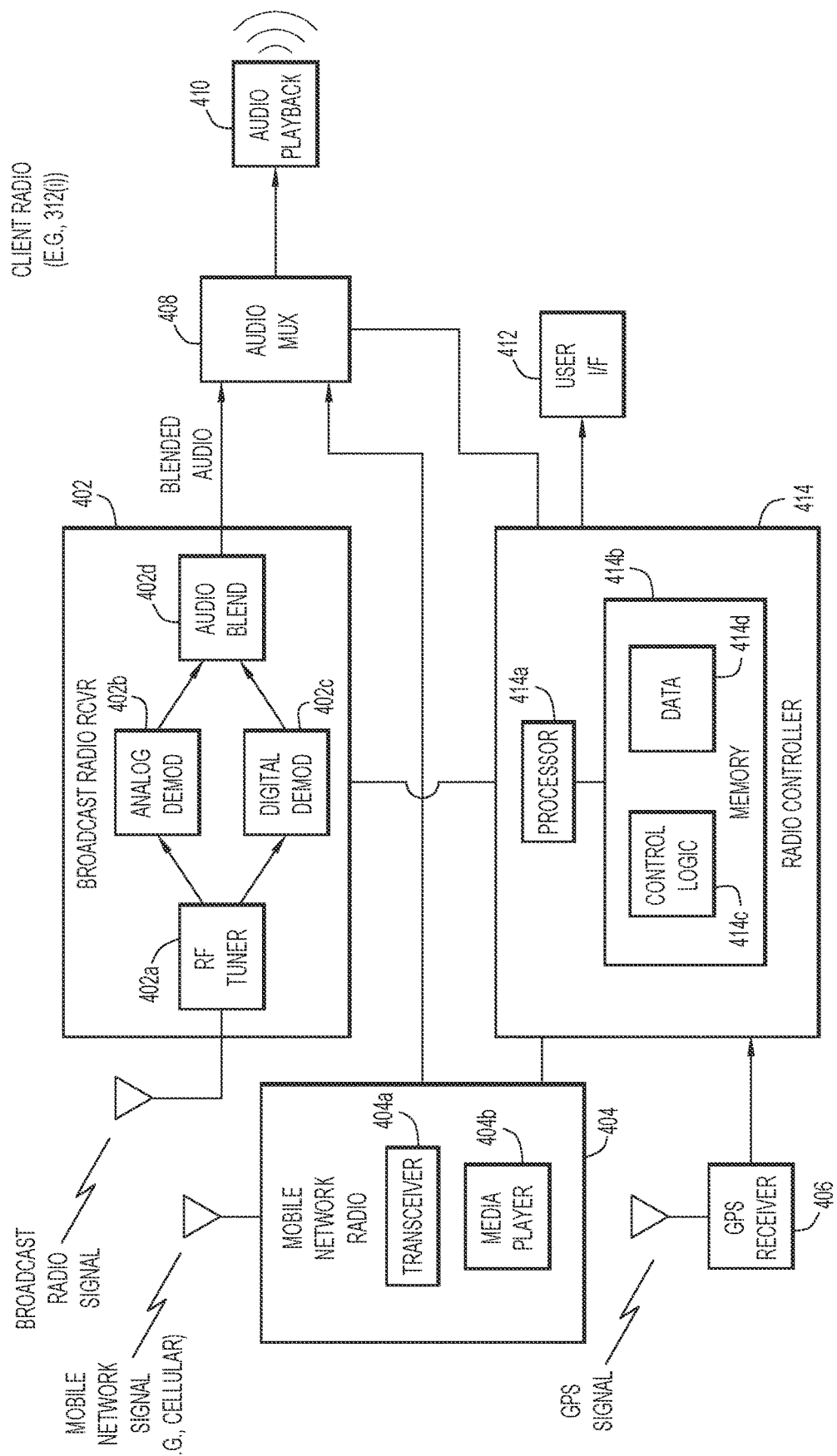
FIG. 4 is a block diagram of an example client radio in the environment of FIG. 3.

FIG. 4 is an example block diagram of an example client radio 312(*i*), according to an embodiment. Client radio 312(*i*) includes a broadcast radio receiver (RCVR) 402, a mobile network radio 404, a GPS receiver 406, an audio multiplexer (MUX) 408, audio playback components 410, user interface (I/F) components 412, and a radio controller 414 (referred to simply as a "controller 414") coupled to and configured to control the aforementioned radio components. In an alternative embodiment, broadcast radio receiver 402 and audio MUX 408 may be omitted from the client radio.

Broadcast radio receiver 402 includes a radio frequency (RF) tuner 402*a* to tune to a given broadcast radio channel/signal, analog and digital demodulators 402*b*, 402*c* to perform demodulation of analog and/or digital radio signals carried by the channel, and an audio blender 402*d* to blend audio from the two demodulators and provide the blended audio to audio MUX 408. In addition, digital demodulator 402*c* may provide metadata and control information recovered from the digital radio signal, when present, to controller 414.

Mobile network radio 404 includes a wireless radio transmitter/receiver (transceiver) 404*a* to communicate with a mobile network, such as cellular network 308. In addition, mobile network radio 404 may be configured to communicate wirelessly with local area networks, e.g., WiFi networks, and the like. Mobile network radio 404 establishes a wireless data connection with the mobile network, and exchanges data packets with the mobile network over the wireless data connection. Mobile network radio 404 also includes a media player 404*b* configured to recover streaming audio content from data packets received from the mobile network, and provide the streaming audio to audio MUX 408. Mobile network radio 404 may provide data packets received from the mobile network to controller 414. Controller 414 may send data packets destined for the mobile network to mobile network radio 404, to be transmitted to the mobile network.

User interface (I/F) components 412 may include a control panel (e.g., a touchscreen display, keypad, dials, control buttons, and so on) through which a user interacts with and controls client radio 312(*i*). In an example, user interface components 412 receive input from a user (e.g., radio station tune commands), convert the input to command/control signals (e.g., frequency tune commands), and forward the command/control signals to controller 414. Controller 414 controls client radio 312(*i*) according to the command/control signals.

GPS receiver 406 tracks a location of the GPS receiver/client radio 312(*i*), and provides the location to controller 414.

Controller 414 provides overall control of client radio 312(*i*), and implements embodiments presented herein. Controller 414 is coupled to and communicates with the aforementioned client radio components over respective interfaces with the client radio components. Controller 414 includes processor(s) 414*a* and a memory 414*b*. Memory 414*b* stores control software 414*c* (referred as "control logic"), that when executed by the processor(s) 414*a*, causes the processor(s), and more generally, controller 414, to perform the various operations described herein for client radio 312(*i*). The processor(s) 414*a* may be a microprocessor or microcontroller (or multiple instances of such components). The memory 414*b* may include read only memory (ROM), random access memory (RAM), magnetic disk storage media devices, optical storage media devices, flash memory devices, electrical, optical, or other physically tangible (i.e., non-transitory) memory storage devices. Controller 414 may also be discrete logic embedded within an integrated circuit (IC) device.

Thus, in general, the memory 414*b* may comprise one or more tangible (non-transitory) computer readable storage media (e.g., memory device(s)) encoded with software or firmware that comprises computer executable instructions. Memory 414*b* also includes data 414*d* generated and used by control software 414*c*.

Audio MUX 408 selectively outputs audio responsive to a control signal asserted by controller 414, and provides the audio for playback to audio playback components 410, which playback the audio. That is, audio MUX 408 selects either (OTA) broadcast radio audio provided by broadcast radio receiver 402 or streamed audio provided by media player 404*b*, as the playback audio. Audio playback components 410 may include loudspeakers, Bluetooth or other wireless audio playback components, audio jacks/ports for earphones, and the like.

Figure 5:
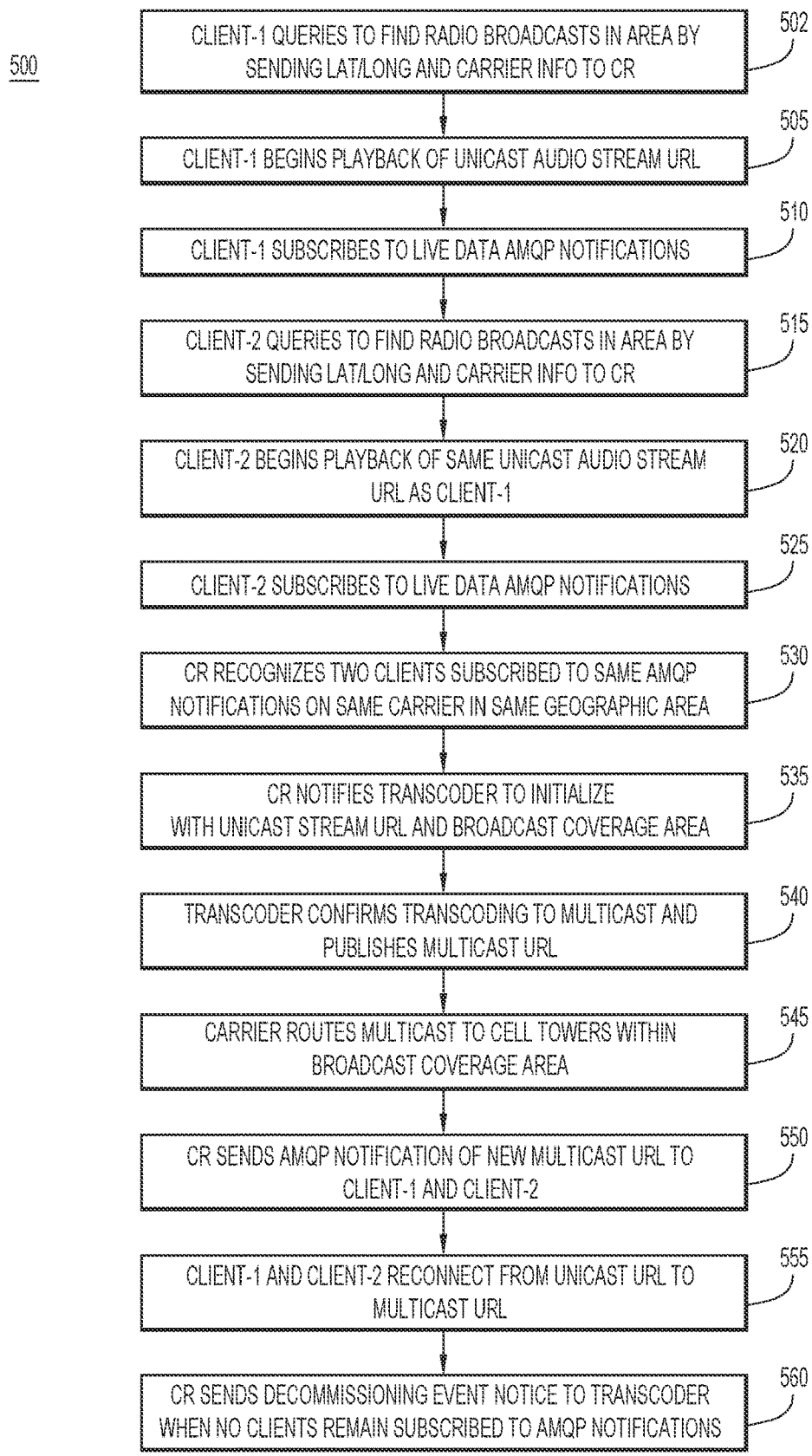
FIG. 5 is a flowchart of an example method of content linking multicast streaming performed in the environment of FIG. 3.

FIG. 5 is a flowchart of a high-level method 500 of content linking multicast streaming performed in environment 300.

At 502, client radio 312(1) (referred to as "client-1") establishes a first wireless data connection (e.g., a first Internet connection) with CR 304 over cellular network 308 and communication network 310. Client-1 communicates with CR 304 over the first wireless data connection. Client-1 sends, to CR 304, a first query or request for a list of broadcast radio stations in a geographical area in which client-1 is located. CR 304 receives the first query. The first query includes a first location (e.g., latitude and longitude) of client-1 and a first cellular network identifier for cellular network 308. In response, CR 304 generates, and sends to client-1, first static data or content for broadcast radio stations that includes (i) identifiers of "reachable" broadcast radio stations that are considered reachable by/within a listening range of client-1 based on the first location, and (ii) unicast broadcast stream identifiers (also referred to as "unicast audio stream identifiers") of unicast broadcast radio streams (also referred to as "unicast audio streams") associated with the broadcast radio stations, e.g., the unicast audio streams carry audio program content for the broadcast radio stations. The identifiers of the unicast audio streams may include unicast (network) addresses, e.g., uniform resource locators (URLs), and the like. Such identifiers may be considered "links" to the audio content. Thus, use of the identifiers to stream audio may be considered "content linking."

At 505, client-1 accesses (i.e., begins streaming and playing-back) a unicast audio stream associated with a particular broadcast radio station (as represented by a particular radio broadcaster and channel/station that the radio broadcaster transmits) based on a unicast address for the unicast audio stream that is listed in the first static data. For example, when audio content for the unicast audio stream is stored on content server 302, client-1 may access the unicast audio stream from the server based on the unicast address.

At 510, client-1 sends to a live data subscription service a first subscription or request for live data notifications for the unicast audio stream, which is received by CR 304. The first subscription request includes a first unicast audio stream identifier (e.g., the unicast address) of the unicast audio stream to which the live data notifications apply. The live data subscription service may include a messaging protocol such as Advanced Message Queuing Protocol (AMQP) or Message Queuing Telemetry Transport (MQTT) subscription service accessible to, or included with, CR 304, for example. The live data notifications (e.g., AMQP notifications) provided by the live data subscription service include metadata and content associated with the unicast audio stream, as mentioned above.

At 515, client radio 312(2) (referred to as "client-2") establishes a second wireless data connection (e.g., an Internet connection) with CR 304 over cellular network 308 and communication network 310. Client-2 sends, to CR 304, a second query/request for broadcast radio stations in a geographical area in which client-2 is located. CR 304 receives the second query. The second query includes a second location of client-2 and a second cellular network identifier for cellular network 308, which is the same as the first cellular network identifier. In response, CR 304 generates, and sends to client-2, second static data that includes identifiers of reachable broadcast radio stations for client-2 based on the second location of client-2, and unicast audio stream identifiers associated with the reachable broadcast radio stations.

At 520, client-2 access the same unicast audio stream associated with the particular broadcast radio station from the unicast audio stream identifier for the unicast audio stream provided in the second static data.

At 525, client-2 sends a second subscription to the live data notification service for live data notifications for the unicast audio stream, which is received by CR 304. The second subscription (request) includes the unicast audio stream identifier for the unicast audio stream.

At 530, CR 304 recognizes/determines that client-1 and client-2 are both subscribed to the same live data notifications for the particular broadcast radio station on the same cellular network in the same geographic area. That is, CR 304 determines that client-1 and client-2 are simultaneously accessing the (same) unicast audio stream (i.e., the same streamed/streaming audio content) associated with the particular broadcast radio station over the same cellular network. For example, CR 304 determines that (i) the first and second cellular network identifiers in the first and second requests for the static data are the same, (ii) the unicast audio stream identifiers included in the first and second subscriptions are the same, and (iii) the particular (same) broadcast radio station is associated with both of the subscriptions, and thus, the two clients are in the same geographic area. CR 304 may also determine the proximity of the two clients to one another based on the first and second locations provided by the clients.

Responsive to the determination made at 530, at 535, CR 304 identifies/designates a unicast audio stream (referred to generally as a "designated audio stream," and more specifically as a "designated unicast audio stream") associated with the particular broadcast radio station (e.g., that includes program content for the particular broadcast radio station) and that is to be streamed to client-1 and client-2 using multicasting. The designated unicast audio stream is not presently in multicast form. CR 304 accesses an identifier for the designated unicast audio stream (i.e., a designated unicast audio stream identifier), such as an address/URL for the designated unicast audio stream. The designated unicast audio stream may represent the unicast audio streams currently being streamed to client-1 and client-2, or may be an alternative unicast audio stream identified by its own unicast audio stream identifier as specified by a broadcaster of the particular broadcast radio station. In one example, the alternative unicast audio stream may include an HD radio bitstream associated with the particular broadcast radio station and identified through CR 304.

CR 304 sends to cellular network 308 (e.g., to transcoder 230) a command, including command information, to convert the designated unicast audio stream to a multicast audio stream. The command information includes the designated unicast audio stream identifier (e.g., unicast address, which may be a unicast source address) and a geographical descriptor that is indicative of a geographical broadcast coverage area of the particular broadcast radio station. In an example, the geographical descriptor may include one or more broadcast contour polygons representative of the geographical broadcast coverage area, as described below in connection with FIG. 7. The geographical descriptor may be formatted in the Keyhole Markup Language (KML), for example.

Using the designated unicast audio stream identifier, transcoder 230 accesses the designated unicast audio stream (or source content for that stream) and transcodes it to a multicast audio stream, including adding forward error correction, for example. In addition, CR 304 determines a total number of clients that are subscribed to the live data for the multicast audio stream (e.g., 2 in this example), and sends to the broadcaster of the particular broadcast radio station a message that indicates the total number. This may facilitate billing and/or popularity tracking of broadcast radio station/audio content by the broadcaster.

At 540, transcoder 230 confirms the transcoding to CR 304, and publishes to the CR a multicast audio stream identifier (e.g., a multicast (network) address or URL) from which the multicast audio stream may be accessed/streamed. CR 304 receives the confirmation and the multicast audio stream identifier.

At 545, using the geographical descriptor, cellular network 308 configures network devices R to forward the multicast audio stream from transcoder 230 to the particular cell transmitters within the geographical broadcast coverage area from which the multicast audio stream is to be transmitted to client-1 and client-2. For example, cellular network establishes multicast routes for the multicast audio stream from transcoder 230 to the particular cell transmitters.

Upon receiving the multicast audio stream identifier from transcoder 230, at 550, CR 304 notifies client-1 and client-2 via live data notifications that indicate that new information about the station is available including the multicast audio stream, e.g., that the multicast audio stream identifier is available.

Upon receiving the live data notifications, at 555, client-1 and client-2 each access the multicast audio stream identifier from CR 304 and switch from streaming the unicast audio stream to streaming the multicast audio stream based on/from the multicast audio stream identifier.

A subsequent client radio (e.g., client-3) can receive station information that includes the multicast audio stream, allowing the subsequent client to join the multicast audio stream directly without first subscribing to the unicast audio stream.

Finally, upon receiving from client-1 and client-2 respective notifications to cease live data notifications for the multicast audio stream, at 560, CR 304 determines that there are no client radios subscribed to the live data notifications, and sends to transcoder 230 a decommissioning event with respect to the multicast audio stream, which causes the transcoder to cease generating the multicast audio stream.

Figure 6A:
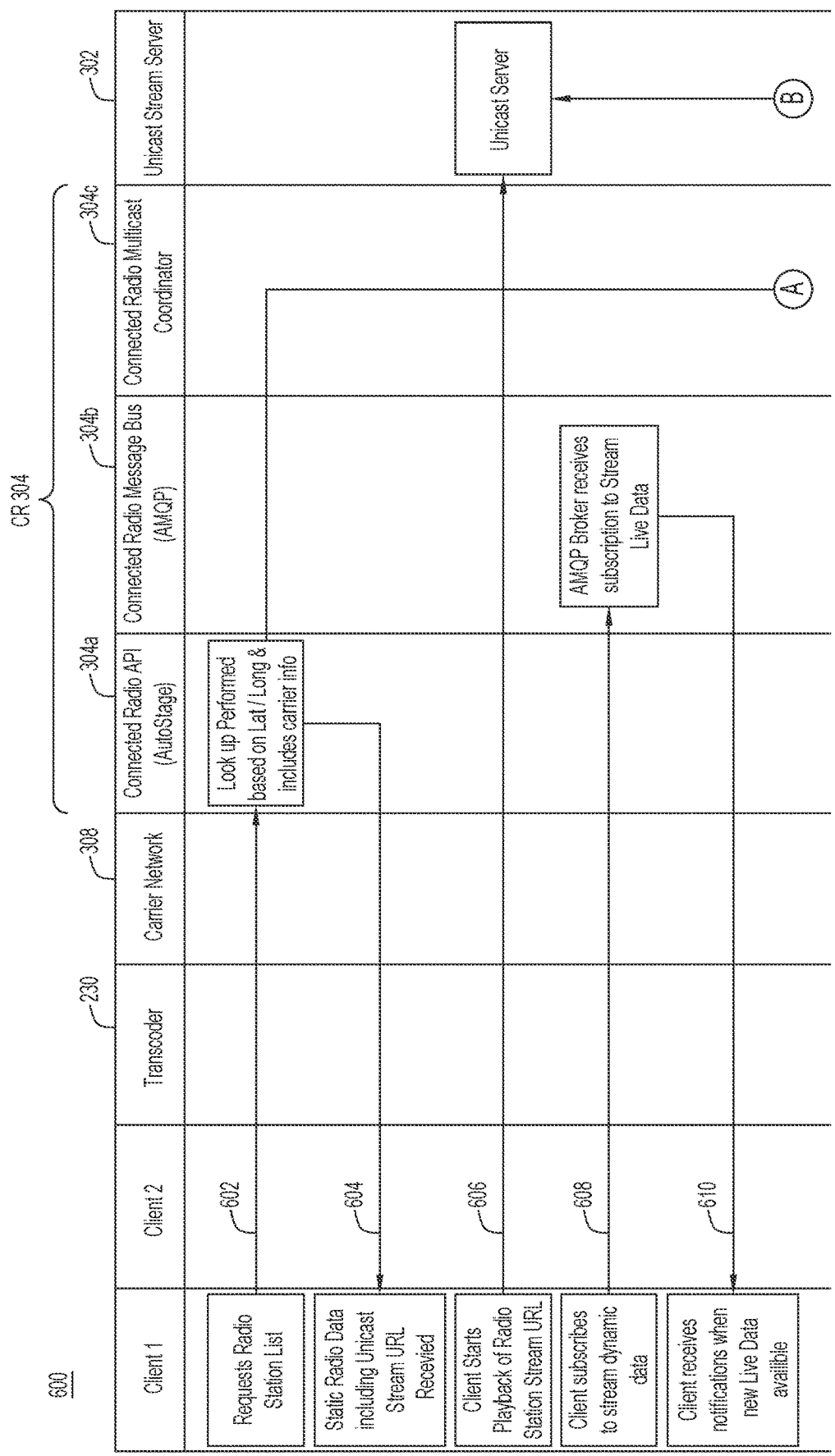
Figure 6C:
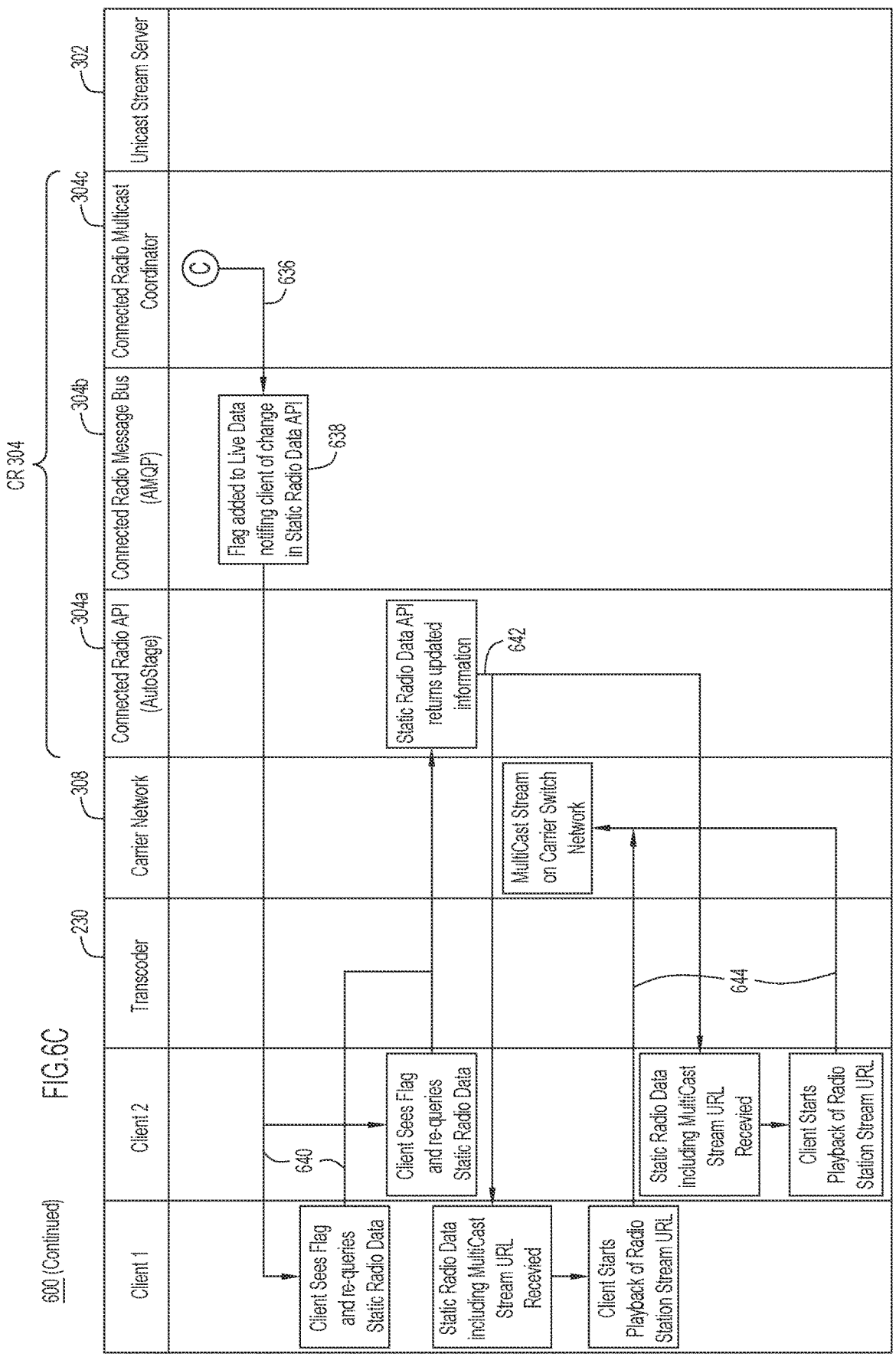

FIGS. 6A-6C are a transaction diagram of example transactions 600 in environment 300 performed in connection with method 500. Some of transactions 600 are described above. In the example of FIGS. 6A-6C, CR 304 includes a CR API 304*a* (referred to simply as "API" 304*a*), a CR radio message bus 304*b* associated with an AMQP service (referred to simply as "AMQP" 304*b*), and a CR multicast coordinator 304c (referred to simply as "coordinator" 304c) that all communicate with each other. The AMQP service is referenced in FIGS. 6A-6C by way of example, only; it is understood that any other notification services similar to the AMQP service may be used.

Referring first to FIG. 6A, at 602, API 304a receives from client-1 a first request for a station list. The first request includes a first cellular network identifier for cellular (i.e., carrier) network 308 (e.g., operator/carrier identifiers, such as Verizon, AT&T, Sprint, and so on, in addition to other cellular network specific identifiers by which the cellular network may be uniquely identified) and a first location of client-1. In response, at 604, API 304a sends to client-1 first static data including identifiers of reachable broadcast radio stations and their associated unicast audio stream identifiers based on the first location. At 606, client-1 accesses (e.g., begins streaming and playback of) a unicast audio stream associated with a particular broadcast radio station using a first unicast audio stream identifier (e.g., URL) listed in the first static data. In the example of FIG. 6A, the audio content for the unicast audio stream resides on content server 302. At 608, AMQP 304b receives from client-1 a first subscription to stream live data (also referred to as "dynamic data") associated with the unicast audio stream. In response, at 610, AMQP 304b sends to client-1 notifications when new live data is available for the unicast audio stream.

Turning to FIG. 6B, at 612-620, client-2 and CR 304 essentially repeat operations 602-610, but in the context of client-2. Thus, at 612, API 304a receives from client-2 a second request for a station list. The second request includes a second cellular network identifier (which is the same as the first cellular network identifier) for cellular network 308 and a second location of client-2. In response, at 614, API 304b sends to client-2 second static data including identifiers of reachable broadcast radio stations and their associated unicast audio stream identifiers based on the second location. At 616, client-2 accesses (e.g., begins streaming and playback of) the unicast audio stream (i.e., the same audio stream being unicast audio streamed by client-1) associated with the particular broadcast radio station using a second unicast audio stream identifier (which is the same as the first unicast audio stream identifier) listed in the second static data. At 618, AMQP 304b receives from client-2 a second subscription to stream live data associated with the unicast audio stream. In response, at 620, AMQP 304b sends to client-2 notifications when new live data is available for the unicast audio stream.

Based on operations 602-620, CR 304 receives from client-1 and client-2 over respective wireless data/cellular connections with the client radios (i) cellular network information, e.g., the first and second cellular network identifiers, which are the same, and (ii) broadcast radio audio stream information, e.g., the first and second unicast audio stream identifiers, which are also the same. CR 304 also has access to the first and second client radio locations and the identifier of the particular broadcast radio station. Based on the aforementioned information, at 630, coordinator 304c determines that client-1 and client-2 (i.e., multiple client radios) are simultaneously accessing the same audio content by streaming respective unicast audio streams of the content over the same cellular network (e.g., cellular network 308). In response, coordinator 304c identifies/designates a unicast audio stream to be converted to multicast form. The designated unicast audio stream may be the unicast audio stream currently being streamed to client-1 and client-2, or a different unicast audio stream associated with the particular broadcast radio station and that is designated by the broadcaster of the particular broadcast radio station, for example.

Coordinator 304c commands transcoder 230 to convert the designated unicast audio stream to a multicast audio stream (this includes sending the designated unicast audio stream identifier to the transcoder), and provides to the transcoder/cellular network 308 the geographic descriptor indicative of the geographical broadcast area covered by the broadcast radio station, as described above. In the example depicted in FIGS. 6A-6C, coordinator 304c identifies/designates the unicast audio stream currently being streamed to client-1 and client-2 as the designated unicast audio stream, and thus commands transcoder 230 to convert that unicast audio stream to multicast form, which includes sending the unicast audio stream identifier to the transcoder.

At 632, transcoder 230 generates the multicast audio stream based on the audio content from which the unicast audio streams were generated, and notifies/requests cellular network 308 (e.g., a controller of the cellular network and/or various network devices R) to post the multicast audio on the network devices and particular cell transmitters within the geographical broadcast area. In response, at 634, cellular network 308 performs the requested actions to enable forwarding of the multicast audio stream from transcoder 230 to the particular cell transmitters, and then notifies coordinator 304c that the multicast audio stream is available. Alternatively, transcoder 230 provides the notification to coordinator 304c, which includes providing a multicast audio stream identifier to coordinator 304c. Responsive to the notification from 634, at 636, coordinator 304c appends the multicast audio stream identifier to the static data and indicates this action to AMPQ 304b.

Turning to FIG. 6C, at 638, AMPQ 304b adds a flag to the live data notifications to notify client-1 and client-2 that there is a static data update, i.e., updated static data. At 640, client-1 and client-2 both receive the flag and re-query API 304a for the updated static data. In response, at 642, API 304a sends the updated static data to client-1 and client-2. At 644, client-1 and client-2 begin streaming the multicast audio data based on the multicast audio stream identifier in the updated static data. The streaming source may be transcoder 230, for example.

In one example, the multicast audio stream identifier may include at least a predetermined multicast group address (e.g., IPv4 or IPv6 group address) for the multicast audio stream. The multicast audio stream identifier may also include a source address for the multicast audio stream (e.g. for transcoder 230). To request/receive the multicast audio stream, each client radio may originate toward cellular network 308 a respective multicast group membership join (e.g., an IGMP join) that specifies the group address (and additionally the source address, in some examples) using known multicast-related protocols. Responsive to the join, cellular network 308 forwards the multicast audio stream to the client radio. Other mechanisms may be used to establish the multicast streaming to each client radio.

Figure 7:
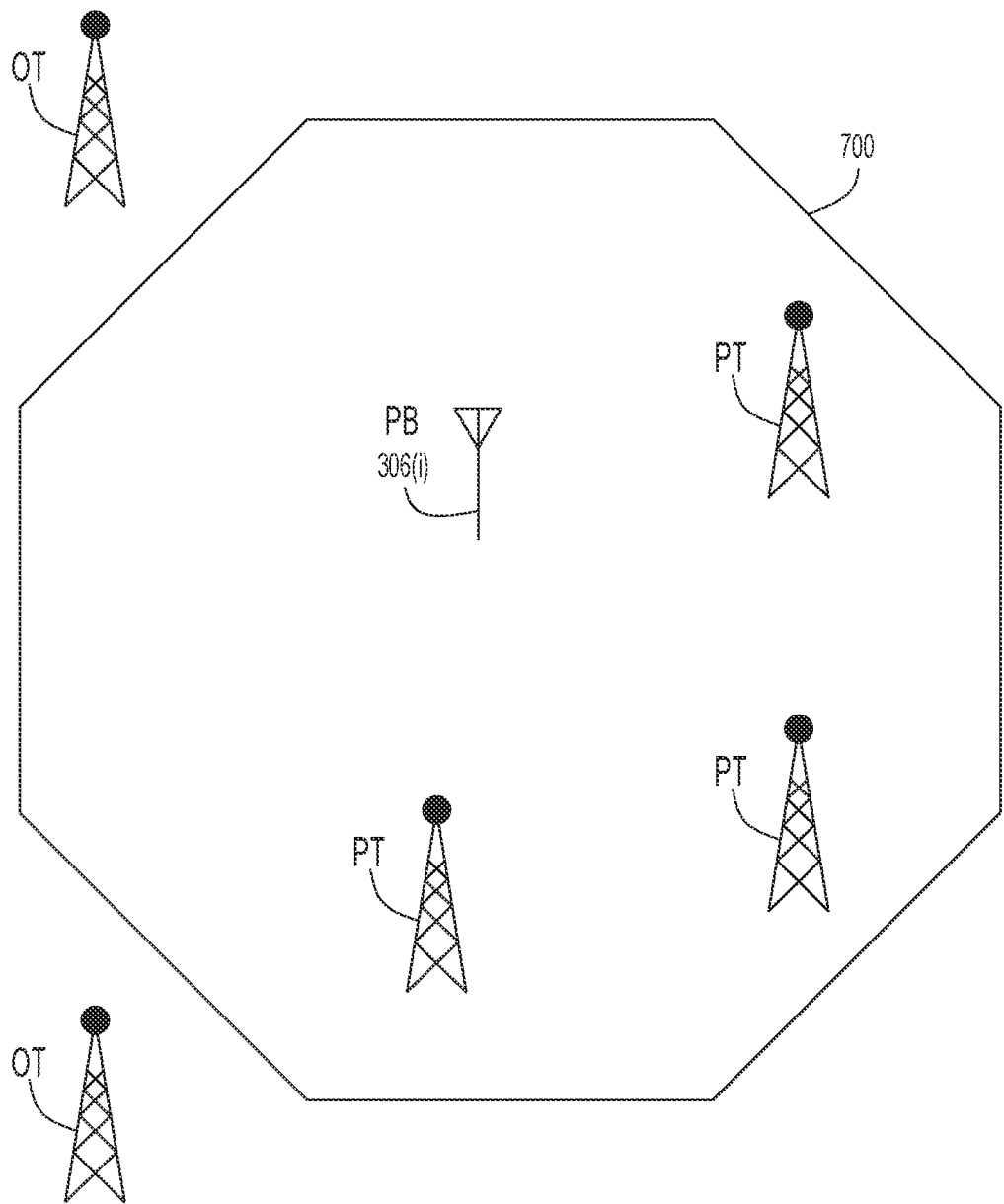
FIG. 7 is an illustration of an example geographic descriptor configured as a predetermined polygon.

FIG. 7 is an illustration of an example geographic descriptor 700 configured as a predetermined polygon that circumscribes a geographical broadcast coverage area for a particular broadcast radio station transmitter PB (306(i)). The geographical broadcast coverage area encompasses particular cell transmitters PT of cellular network 308 to which the multicast audio stream is to be forwarded by network devices R of the cellular network. Cell transmitters OT of cellular network 308 that fall outside of the geographical broadcast coverage area are to be ignored with respect to the multicast audio stream.

FIG. 8 is a flowchart of an example method 800 of content linking multicast streaming performed primarily by CR 304 (referred to as a "connected radio service" in the description of FIG. 8) in concert with multiple client radios (e.g., client-1 and client-2) in environment 300. Operations of method 800 are described above. The connected radio service operates in association/communication with broadcast radio stations (e.g., radio broadcasters and the broadcast radio stations/signals transmitted by the broadcaster).

At 802, the connected radio service receives cellular network information and broadcast radio audio stream information from multiple client radios over wireless data connections with the multiple client radios. The cellular network information includes cellular network identifiers of cellular networks (e.g., cellular network 308) to which the multiple client radios are connected, and the broadcast radio audio stream information includes unicast audio stream identifiers (e.g., unicast (network) addresses) of unicast audio streams that the multiple client radios are accessing.

To collect the cellular network information and the broadcast radio audio stream information, the connected radio service may receive, from the multiple client radios, respective requests for static data (e.g., broadcast radio stations lists). The requests may identify the cellular networks, and include client radio locations. Responsive to the requests, the connected radio service sends to the multiple client radios respective static data that identifies (i) reachable broadcast radio stations considered to be in range of the client radio locations, and (ii) unicast audio streams, including the same unicast audio stream, associated with the reachable broadcast radio stations. The connected radio service may also receive, from the multiple client radios, subscriptions to stream live data associated with the same unicast audio stream. The subscriptions identify the same unicast audio stream.

At 804, upon determining that the multiple client radios are all simultaneously accessing a same unicast audio stream associated with a particular broadcast radio station among the broadcast radio stations over a same cellular network based on the cellular network information and the broadcast radio audio stream information, the connected radio service configures the same cellular network to convert a designated unicast audio stream (which may be the same unicast audio stream or an alternative unicast audio stream associated with the particular broadcast radio station) to a multicast audio stream. For example, the connected radio service commands a transcoder in the same cellular network to convert the same unicast audio stream, or audio content from which the same unicast audio stream is derived, to the multicast audio stream. The connected radio service may perform the determining by determining that the cellular network identifiers all identify the same cellular network, and that the unicast audio stream identifiers all identify the same unicast audio stream.

In addition, the connected radio services sends, to the same cellular network (e.g., to the transcoder), a geographical/area descriptor that is indicative of a geographical broadcast coverage area of the particular broadcast radio station, to enable the same cellular network to route the multicast broadcast radio stream from the transcoder to particular cell transmitters within the geographical broadcast coverage area At 806, upon receiving a multicast audio stream identifier (e.g., a multicast address) for the multicast broadcast radio stream from the same cellular network (e.g., from the transcoder), the connected radio service sends the multicast address to the multiple client radios over the wireless data connections to enable the multiple client radios to access the multicast audio stream. This may include (i) updating the static data with the multicast address, (ii) using live data notifications, notifying the multiple client radios that the static data is updated, and (iii) subsequently, upon receiving requests for the static data from the multiple client radios, sending the static data that is updated with the multicast address to the multiple client radios.

In addition, the connected radio service may determine a total number of the multiple client radios accessing the multicast audio stream, and report the total number to the broadcaster of the particular broadcast radio station/channel.

Figure 9:
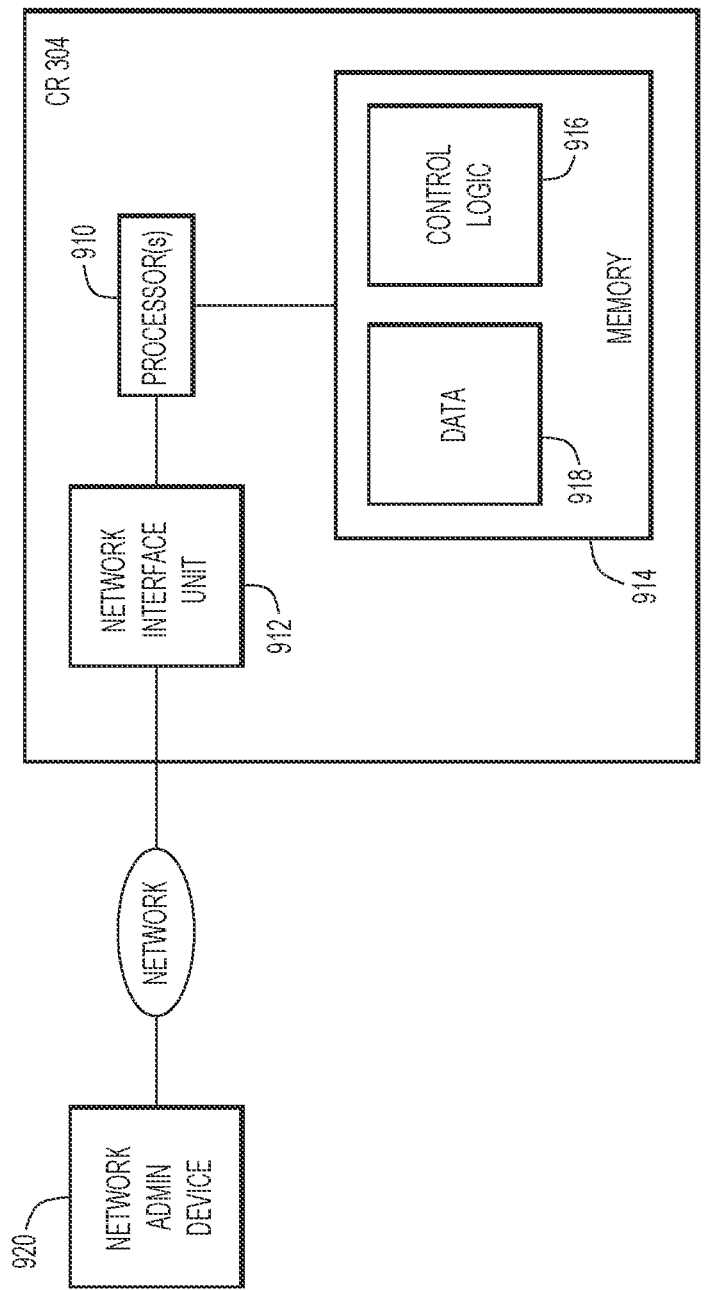
FIG. 9 is a block diagram of a computer device or server configured to perform operations of the connected radio service.

FIG. 9 is an example block diagram for CR 304. In the example, CR 304 includes a computer system, such as a server, having one or more processors 910, a network interface unit (NIU) 912, and a memory 914. Memory 914 stores control software 916 (referred as "control logic"), that when executed by the processor(s) 910, causes the computer system to perform the various operations described herein for CR 304.

The processor(s) 910 may be a microprocessor or microcontroller (or multiple instances of such components) and may be implemented in hardware and software. The NIU 912 may be implemented in hardware and software, and enables CR 304 to communicate over wired connections or wirelessly with a network, such as communication network 310. NIU 912 may include, for example, an Ethernet card or other interface device having a connection port that enables CR 304 to communicate over the network via the connection port. In a wireless embodiment, NIU 912 includes a wireless transceiver and an antenna to transmit and receive wireless communication signals to and from the network.

The memory 914 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 914 may comprise one or more tangible (non-transitory) computer readable storage media (e.g., memory device(s)) encoded with software or firmware that comprises computer executable instructions. For example, control software 916 includes logic to implement operations performed by the CR 304. Thus, control software 916 implements the various methods/operations described above, including methods presented herein. Memory 914 also stores data 918 generated and used by control software 916.

A user, such as a network administrator, may interact with CR 304 through a user device 920 (also referred to as a "network administration device") that connects by way of a network with CR 304. The user device 920 may be a personal computer (laptop, desktop), tablet computer, SmartPhone, and the like, with user input and output devices, such as a display, keyboard, mouse, and so on. Alternatively, the functionality and a display associated with user device 920 may be provided local to or integrated with CR 304.

In summary, in one embodiment, a method is provided comprising: at a cloud-based connected radio service associated with broadcast radio stations (e.g., that operates in connection/concert with broadcasters of the broadcast radio stations): receiving cellular network information and broadcast radio audio stream information from multiple client radios over wireless data connections with the multiple client radios; upon determining that the multiple client radios are all simultaneously accessing a same unicast audio stream associated with a particular broadcast radio station among the broadcast radio stations over a same cellular network based on the cellular network information and the broadcast radio audio stream information, configuring the same cellular network to convert a designated audio stream associated with the particular broadcast radio station to a multicast audio stream; and upon receiving a multicast address for the multicast audio stream from the same cellular network, sending the multicast address to the multiple client radios over the wireless data connections to enable the multiple client radios to access the multicast audio stream.

In another embodiment, an apparatus is provided comprising: a network interface unit configured to communicate with a network; and a processor coupled to the network interface unit and configured to perform operations for a connected radio service associated with broadcast radio stations, including: receiving cellular network information and audio stream information from multiple client radios over wireless data connections with the multiple client radios; upon determining that the multiple client radios are all simultaneously accessing a same unicast audio stream associated with a particular broadcast radio station among the broadcast radio stations over a same cellular network based on the cellular network information and the audio stream information, configuring the same cellular network to convert the same unicast audio stream to a multicast audio stream; and upon receiving a multicast address for the multicast audio stream from the same cellular network, sending the multicast address to the multiple client radios over the wireless data connections to enable the multiple client radios to access the multicast audio stream.

In yet another embodiment, a non-transitory computer readable medium is provided. The medium is encoded with instructions that, when executed by a processor, causes the processor to perform to perform: receiving cellular network information and audio stream information from multiple client radios over wireless data connections with the multiple client radios; upon determining that the multiple client radios are all simultaneously accessing a same unicast audio stream associated with a particular broadcast radio station among the broadcast radio stations over a same cellular network based on the cellular network information and the audio stream information, commanding a transcoder in the same cellular network to convert the same unicast audio stream to a multicast audio stream; and upon receiving a multicast address for the multicast audio stream from the transcoder, sending the multicast address to the multiple client radios over the wireless data connections to enable the multiple client radios to access the multicast audio stream.

Note that in this Specification, references to various features (e.g., elements, structures, modules, components, logic, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations described with reference to the preceding figures illustrate only some of the possible scenarios that may be executed by one or more entities and components discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
   at a cloud-based connected radio service associated with broadcast radio stations:
   receiving cellular network information and broadcast radio audio stream information from multiple client radios over wireless data connections with the multiple client radios;
   upon determining that the multiple client radios are all simultaneously accessing a same unicast audio stream associated with a particular broadcast radio station among the broadcast radio stations over a same cellular network based on the cellular network information and the broadcast radio audio stream information, configuring the same cellular network to convert a designated audio stream associated with the particular broadcast radio station to a multicast audio stream; and upon receiving a multicast address for the multicast audio stream from the same cellular network, sending the multicast address to the multiple client radios over the wireless data connections to enable the multiple client radios to access the multicast audio stream.

2. The method of claim 1, wherein the cellular network information includes cellular network identifiers of cellular networks to which the multiple client radios are connected, and the broadcast radio audio stream information includes unicast audio stream identifiers of unicast audio streams that the multiple client radios are accessing; and the determining includes determining that cellular network identifiers all identify the same cellular network, and that unicast audio stream identifiers all identify the same unicast audio stream.

3. The method of claim 1, wherein the receiving includes receiving, from the multiple client radios, subscriptions to stream live data associated with the same unicast audio stream; and the determining includes determining that the multiple client radios are all simultaneously accessing the same unicast audio stream based on receiving the subscriptions.

4. The method of claim 1, further comprising, at the connected radio service:

receiving, from the multiple client radios, client radio locations; and sending, to the multiple client radios, static data that identifies (i) reachable broadcast radio stations considered to be in range of the client radio locations, and (ii) unicast audio streams, including the same unicast audio stream, associated with the reachable broadcast radio stations.

5. The method of claim 4, further comprising, at the connected radio service:

upon receiving the multicast address, updating the static data with the multicast address, and notifying the multiple client radios that the static data is updated; and upon receiving requests for the static data from the multiple client radios, sending the static data that is updated with the multicast address to the multiple client radios.

6. The method of claim 4, further comprising, at the connected radio service:

upon receiving the multicast address, notifying the multiple client radios that an information update is available; and upon receiving requests for the information update from the multiple client radios, sending the multicast address to the multiple client radios.

7. The method of claim 1, wherein the designated audio stream is the same unicast audio stream or audio content from which the same unicast audio stream is derived.

8. The method of claim 1, wherein configuring the same cellular network includes:

commanding a transcoder in the same cellular network to convert the designated audio stream to the multicast audio stream.

9. The method of claim 8, wherein configuring the same cellular network further includes:

sending, to the same cellular network, a geographical descriptor that indicates a geographical broadcast coverage area associated with the particular broadcast radio station, to enable the same cellular network to forward the multicast audio stream from the transcoder to particular cellular transmitters within the geographical broadcast coverage area.

10. The method of claim 9, wherein the geographical descriptor includes one or more polygons representative of the geographical broadcast coverage area.

11. The method of claim 9, further comprising, at the same cellular network:

upon receiving the geographical descriptor, determining the particular cellular transmitters in the same cellular network, and establishing multicast routes for the multicast audio stream from the transcoder to the particular cellular transmitters.

12. The method of claim 1, wherein the multiple client radios each includes a broadcast radio receiver to receive and demodulate broadcast radio signals and a cellular radio to communicate with a cellular network.

13. The method of claim 1, further comprising, at the connected radio service:

determining a total number of the multiple client radios accessing the multicast audio stream and reporting the total number to the particular broadcast radio station.

14. An apparatus comprising:

a network interface unit configured to communicate with a network; and a processor coupled to the network interface unit and configured to perform operations for a connected radio service associated with broadcast radio stations, including:

receiving cellular network information and audio stream information from multiple client radios over wireless data connections with the multiple client radios;

upon determining that the multiple client radios are all simultaneously accessing a same unicast audio stream associated with a particular broadcast radio station among the broadcast radio stations over a same cellular network based on the cellular network information and the audio stream information, configuring the same cellular network to convert the same unicast audio stream to a multicast audio stream; and upon receiving a multicast address for the multicast audio stream from the same cellular network, sending the multicast address to the multiple client radios over the wireless data connections to enable the multiple client radios to access the multicast audio stream.

15. The apparatus of claim 14, wherein:

the cellular network information includes cellular network identifiers of cellular networks to which the multiple client radios are connected, and the audio stream information includes unicast audio stream identifiers of unicast audio streams that the multiple client radios are accessing; and the processor is configured to perform determining by determining that the cellular network identifiers all identify the same cellular network, and that the unicast audio stream identifiers all identify the same unicast audio stream.

16. The apparatus of claim 14, wherein the processor is further configured to perform:

responsive to determining, sending, to the same cellular network, a geographical descriptor that is indicative of a geographical broadcast coverage area of the particular broadcast radio station, to enable the same cellular network to forward the multicast audio stream to particular cellular transmitters within the geographical broadcast coverage area.

17. The apparatus of claim 14, wherein the processor is configured to perform configuring the same cellular network:
commanding a transcoder in the same cellular network to convert the same unicast audio stream to the multicast audio stream.

18. A non-transitory computer readable medium encoded with instructions that, when executed by a processor of a connected radio service associated with broadcast radio stations, causes the processor to perform:
receiving cellular network information and audio stream information from multiple client radios over wireless data connections with the multiple client radios;
upon determining that the multiple client radios are all simultaneously accessing a same unicast audio stream associated with a particular broadcast radio station among the broadcast radio stations over a same cellular network based on the cellular network information and the audio stream information, commanding a transcoder in the same cellular network to convert the same unicast audio stream to a multicast audio stream; and
upon receiving a multicast address for the multicast audio stream from the transcoder, sending the multicast address to the multiple client radios over the wireless data connections to enable the multiple client radios to access the multicast audio stream.

19. The non-transitory computer readable medium of claim 18, wherein:
the cellular network information includes cellular network identifiers of cellular networks to which the multiple client radios are connected, and the audio stream information includes unicast audio stream identifiers of unicast audio streams that the multiple client radios are accessing; and
determining includes determining that the cellular network identifiers all identify the same cellular network, and that the unicast audio stream identifiers all identify the same unicast audio stream.

20. The non-transitory computer readable medium of claim 18, further comprising instructions to cause the processor to perform:
sending, to the same cellular network, a geographical descriptor that indicates a geographical broadcast coverage area associated with the particular broadcast radio station, to enable the same cellular network to forward the multicast audio stream to particular cellular transmitters within the geographical broadcast coverage area.

* * * * *